(12) United States Patent
Nakamura

(10) Patent No.: US 6,400,422 B1
(45) Date of Patent: Jun. 4, 2002

(54) TELEVISION RECEIVER

(75) Inventor: Hiroki Nakamura, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 0 days.

(21) Appl. No.: 09/464,406

(22) Filed: Dec. 16, 1999

(30) Foreign Application Priority Data

Dec. 17, 1998 (JP) .......................................... 10-359085

(51) Int. Cl.⁷ .............................. H04N 5/50; H04N 5/44; H04N 3/27
(52) U.S. Cl. ........................ 348/732; 348/553; 348/554; 348/731
(58) Field of Search ................................. 348/553, 554, 348/555, 556, 558, 729, 731, 732, 733

(56) References Cited

U.S. PATENT DOCUMENTS

| | | | | |
|---|---|---|---|---|
| 4,405,947 A | * | 9/1983 | Tults et al. | 348/732 |
| 4,737,993 A | * | 4/1988 | Devilbiss | 455/180.1 |
| 4,763,195 A | * | 8/1988 | Tults | 348/732 |
| 4,776,038 A | * | 10/1988 | Testin et al. | 455/182.3 |
| 5,479,214 A | * | 12/1995 | Sakakibara et al. | 348/558 |

FOREIGN PATENT DOCUMENTS

JP         4-67370         10/1992

* cited by examiner

Primary Examiner—John W. Miller
Assistant Examiner—Annan Q. Shang
(74) Attorney, Agent, or Firm—Crowell & Moring LLP

(57) ABSTRACT

A channel preset device a television receiver for receiving one of two television broadcasting modes having different frequency band with each other is disclosed. A signal is received by successively tuning to the respective frequencies of the both broadcasting modes allocated to each of channels. Then it is judged whether each of the received signals includes an actual broadcasting signal. A channel in which the actual broadcasting signal is detected is determined as an on-air channel. The number of channel judged as the on-air channel is counted with respect to each of the both broadcasting modes. A receivable broadcasting mode is judged out of the both broadcasting modes in accordance with the counted number of the on-air channel. The channel preset is conducted with respect to the receivable broadcasting mode.

24 Claims, 8 Drawing Sheets

FIG. 2

| CHNL IND | TV (MHz) | CATV NORMAL (MHz) | CHNL IND | TV (MHz) | CATV NORMAL (MHz) | CHNL IND | TV (MHz) | CATV NORMAL (MHz) |
|---|---|---|---|---|---|---|---|---|
| 1 | - | 73.25 | 51 | 693.25 | 385.25 | 100 | | 649.25 |
| 2 | 55.25 | 55.25 | 52 | 699.25 | 391.25 | 101 | | 655.25 |
| 3 | 61.25 | 61.25 | 53 | 705.25 | 397.25 | 102 | | 661.25 |
| 4 | 67.25 | 67.25 | 54 | 711.25 | 403.25 | 103 | | 667.25 |
| 5 | 77.25 | 77.25 | 55 | 717.25 | 409.25 | 104 | | 673.25 |
| 6 | 83.25 | 83.25 | 56 | 723.25 | 415.25 | 105 | | 679.25 |
| 7 | 175.25 | 175.25 | 57 | 729.25 | 421.25 | 106 | | 685.25 |
| 8 | 181.25 | 181.25 | 58 | 735.25 | 427.25 | 107 | | 691.25 |
| 9 | 187.25 | 187.25 | 59 | 741.25 | 433.25 | 108 | | 697.25 |
| 10 | 193.25 | 193.25 | 60 | 747.25 | 439.25 | 109 | | 703.25 |
| 11 | 199.25 | 199.25 | 61 | 753.25 | 445.25 | 110 | | 709.25 |
| 12 | 205.25 | 205.25 | 62 | 759.25 | 451.25 | 111 | | 715.25 |
| 13 | 211.25 | 211.25 | 63 | 765.25 | 457.25 | 112 | | 721.25 |
| 14 | 471.25 | 121.25 | 64 | 771.25 | 463.25 | 113 | | 727.25 |
| 15 | 477.25 | 127.25 | 65 | 777.25 | 469.25 | 114 | | 733.25 |
| 16 | 483.25 | 133.25 | 66 | 783.25 | 475.25 | 115 | | 739.25 |
| 17 | 489.25 | 139.25 | 67 | 789.25 | 481.25 | 116 | | 745.25 |
| 18 | 495.25 | 145.25 | 68 | 795.25 | 487.25 | 117 | | 751.25 |
| 19 | 501.25 | 151.25 | 69 | 801.25 | 493.25 | 118 | | 757.25 |
| 20 | 507.25 | 157.25 | 70 | | 499.25 | 119 | | 763.25 |
| 21 | 513.25 | 163.25 | 71 | | 505.25 | 120 | | 769.25 |
| 22 | 519.25 | 169.25 | 72 | | 511.25 | 121 | | 775.25 |
| 23 | 525.25 | 217.25 | 73 | | 517.25 | 122 | | 781.25 |
| 24 | 531.25 | 223.25 | 74 | | 523.25 | 123 | | 787.25 |
| 25 | 537.25 | 229.25 | 75 | | 529.25 | 124 | | 793.25 |
| 26 | 543.25 | 235.25 | 76 | | 535.25 | 125 | | 799.25 |
| 27 | 549.25 | 241.25 | 77 | | 541.25 | | | |
| 28 | 555.25 | 247.25 | 78 | | 547.25 | | | |
| 29 | 561.25 | 253.25 | 79 | | 553.25 | | | |
| 30 | 567.25 | 259.25 | 80 | | 559.25 | | | |
| 31 | 573.25 | 269.25 | 81 | | 565.25 | | | |
| 32 | 579.25 | 271.25 | 82 | | 571.25 | | | |
| 33 | 585.25 | 277.25 | 83 | | 577.25 | | | |
| 34 | 591.25 | 283.25 | 84 | | 583.25 | | | |
| 35 | 597.25 | 289.25 | 85 | | 589.25 | | | |
| 36 | 603.25 | 295.25 | 86 | | 595.25 | | | |
| 37 | 609.25 | 301.25 | 87 | | 601.25 | | | |
| 38 | 615.25 | 307.25 | 88 | | 607.25 | | | |
| 39 | 621.25 | 313.25 | 89 | | 613.25 | | | |
| 40 | 627.25 | 319.25 | 90 | | 619.25 | | | |
| 41 | 633.25 | 325.25 | 91 | | 625.25 | | | |
| 42 | 639.25 | 331.25 | 92 | | 631.25 | | | |
| 43 | 645.25 | 337.25 | 93 | | 637.25 | | | |
| 44 | 651.25 | 343.25 | 94 | | 643.25 | | | |
| 45 | 657.25 | 349.25 | 95 | | 91.25 | | | |
| 46 | 663.25 | 355.25 | 96 | | 97.25 | | | |
| 47 | 669.25 | 361.25 | 97 | | 103.25 | | | |
| 48 | 675.25 | 367.25 | 98 | | 109.25 | | | |
| 49 | 681.25 | 373.25 | 99 | | 115.25 | | | |
| 50 | 687.25 | 379.25 | | | | | | |

TELEVISION RECEIVER

BACKGROUND OF THE INVENTION

The present invention relates to a television receiver. Specifically, the present invention relates to a television receiver capable of receiving a television broadcasting signal in two different television broadcasting modes.

As an example of this mode television receiver, there is provided a television receiver capable of selectively receiving either a TV broadcasting (via electric wave) or a CATV (cable television) broadcasting (via cable). Since different bands of frequency are allocated to the above two modes of broadcasting, it is impossible to decide a receiving frequency band unless the broadcasting to be received is previously decided. For the above reasons, it is necessary for a user to set a predetermined change-over switch according to the broadcasting mode to be received.

However, setting of the change-over switch is troublesome for the user. Further, when the change-over switch is erroneously set, it is impossible to receive a desired broadcasting mode. In order to solve the above problems, there have been proposed various arts wherein the television receiver itself can discriminate which broadcasting mode can be received.

An example of such related art is disclosed in Japanese Patent Publication No. 467370B. In this art, attention is given to a point at which channels of the CATV broadcasting are allocated to a specific frequency band to which channels of the TV broadcasting are not allocated. At first, it is searched whether a broadcasting signal exists or not in the specific frequency band. If any broadcasting signal is detected, it is judged the CATV broadcasting is receivable. If not, it is judged the TV broadcasting is receivable. In accordance with the result of judgment, a channel preset operation is executed, and tuning is conducted according to the result of channel preset.

However, the following problems may be encountered in the above conventional television receiver.

In the conventional television receiver, it is judged whether CATV broadcasting or TV broadcasting is receivable only by the existence of the CATV broadcasting signal in the specific frequency band before conducting the cannel preset operation. Therefore, in the case where the existence is misjudged due to the ghost or the like, it is impossible to normally receive broadcasting according to the result of the preset operation. For example, when misjudgment is made in such a manner that TV broadcasting is receivable although CATV broadcasting can be originally received, the channel preset is carried out so that TV broadcasting is receivable. Accordingly, receiving control according to the preset result can not be normally conducted.

SUMMARY OF THE INVENTION

The present invention has been accomplished to solve the above problems. It is an object of the present invention to provide a television receiver capable of conducting a more accurate preset processing.

In order to achieve the above object, there is provided a channel preset device in a television receiver for receiving one of two television broadcasting modes having different frequency band with each other, comprising:

signal receiving means for receiving a signal by successively tuning to the respective frequencies of the both broadcasting modes allocated to each of channels;

on-air judgement means for judging whether each of the received signals includes an actual broadcasting signal, and determining a channel in which the actual broadcasting signal is detected as an on-air channel;

count means for counting the number of channel judged as the on-air channel with respect to each of the both broadcasting modes;

mode judgement means for judging a receivable broadcasting mode out of the both broadcasting modes in accordance with the counted number of the on-air channel; and channel preset means for conducting a channel preset with respect to the receivable broadcasting mode.

Preferably, the two broadcasting modes are a normal television broadcasting using a ground wave and a cable television broadcasting.

In the device, there may be configured that the mode judgement means judges the receivable broadcasting mode in accordance with the numbers of the on-air channel which have been counted by the count means so far each time when the on-air judgement means detects the actual broadcasting signal in the both broadcasting modes in association with the same channel.

The device may further comprise:

memory means for storing a channel number of which the actual broadcasting signal is detected in the both broadcasting modes at once; and means for setting the judged receivable broadcasting mode judged by the mode judgement means into the channel stored in the memory means.

In the device, there may be configured that: the count means counts the number of the on-air channel with respect to whole the channel of the television receiver; and the mode judgement means judges a broadcasting mode having a larger number of the on-air channels as the receivable broadcasting mode.

In the device, there may be configured that: the count means counts the number of the on-air channel with respect to only the channels to which different frequencies are allocated with regard to the both broadcasting modes; and the mode judgement means judges a broadcasting mode having a larger number of the on-air channels as the receivable broadcasting mode.

The device may further comprise comparison means for comparing the counted number of the on-air channel with regard to one of the both broadcasting modes to a predetermined number. The mode judgement means judges the compared broadcasting mode as the receivable broadcasting mode when the counted number of the on-air channel is larger than the predetermined number.

Preferably, the predetermined number is the minimum estimated number of the on-air channel of the respective broadcasting modes.

According to the present invention, there is also provided a channel preset method for a television receiver for receiving one of two television broadcasting modes having different frequency band with each other, comprising the steps of:

receiving a signal by successively tuning to the respective frequencies of the both broadcasting modes allocated to each of channels;

judging whether each of the received signals includes an actual broadcasting signal;

determining a channel in which the actual broadcasting signal is detected as an on-air channel;

counting the number of channel judged as the on-air channel with respect to each of the both broadcasting modes;

judging a receivable broadcasting mode out of the both broadcasting modes in accordance with the counted number of the on-air channel; and conducting a channel preset with respect to the receivable broadcasting mode.

Preferably, the two broadcasting modes are a normal television broadcasting using a ground wave and a cable television broadcasting.

In the method, there may be configured that: the receivable broadcasting mode is judged in accordance with the numbers of the on-air channel which have been counted so far each time when the actual broadcasting signal in the both broadcasting modes in association with the same channel.

The method may further comprise the steps of:

storing a channel number of which the actual broadcasting signal is detected in the both broadcasting modes into memory means at once; and setting the judged receivable broadcasting mode into the channel stored in the memory means.

In the method, there may be configured that: the number of the on-air channel is counted with respect to whole the channel of the television receiver; and a broadcasting mode having a larger number of the on-air channels is judged as the receivable broadcasting mode. In the method, there may be configured that: the number of the on-air channel is counted with respect to only the channels to which different frequencies are allocated with regard to the both broadcasting modes; and a broadcasting mode having a larger number of the on-air channels is judged as the receivable broadcasting mode.

The method may further comprise the step of comparing the counted number of the on-air channel with regard to one of the both broadcasting modes to a predetermined number. The compared broadcasting mode is judged as the receivable broadcasting mode when the counted number of the on-air channel is larger than the predetermined number.

Preferably, the predetermined number is the minimum estimated number of the on-air channel of the respective broadcasting modes.

BRIEF DESCRIPTION OF THE DRAWINGS

In the accompanying drawings:

FIG. 2 is a table showing channel plans of TV broadcasting and CATV broad casting;

DETAILED DESCRIPTION OF THE PREFERRED EMBODIMENTS

Referring to the accompanying drawings, a first embodiment of the present invention will be explained below.

Figure 1:
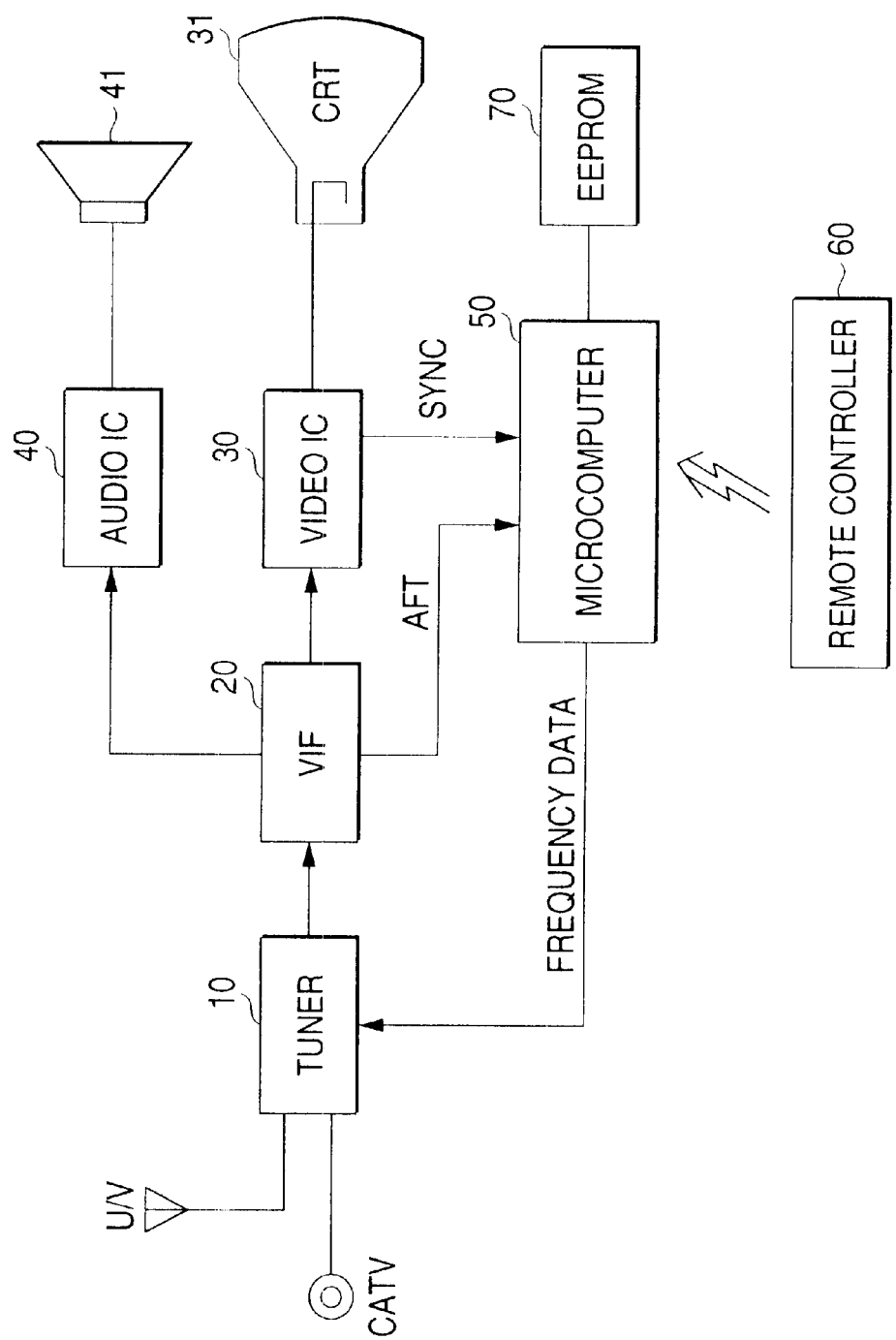
FIG. 1 is a block diagram showing a configuration of a television receiver to which the present invention is applied.

FIG. 1 is a block diagram showing a configuration of a television system to which a television receiver of the present invention is applied.

In the figure, there is provided a tuner 10 to which one of U/V antenna, which is an input source of a television broadcasting signal, and CATV (NORMAL) coaxial cable is connected. The tuner 10 receives a desired frequency corresponding to both of the television broadcasting bands. At the same time, the tuner 10 extracts a desired signal from the received signals and conducts a high-frequency amplification, so that a signal of high-frequency is converted into a signal of intermediate frequency. Then, the thus converted signal of intermediate frequency is outputted from the tuner 10. The tuner 10 used in this embodiment adopts a PLL mode tuning mechanism. In the PLL mode tuning mechanism, when a locally oscillating frequency is directly controlled according to the input of data of a predetermined frequency, the receiving frequency can be controlled.

The intermediate frequency signal, which has been outputted from the tuner 10, is inputted into a VIF circuit 20 and amplified by the image intermediate frequency amplification, and then the signal is outputted into a video IC 30. A sound intermediate frequency signal is taken out as a second sound intermediate frequency signal in the process of image intermediate frequency amplification and subjected to FM detection in an audio IC 40 and appropriately amplified and supplied to a speaker 41.

On the other hand, in the video IC 30, the inputted image intermediate frequency amplifying signal is subjected to image detection. After that, according to the detection output, a horizontal and a vertical synchronizing signal are separated from each other, and the horizontal signal is supplied to a horizontal output stage and the vertical signal is supplied to a vertical output stage. According to the detection output, the signal is subjected to a predetermined color demodulation processing, so that the original color signal is generated. A CRT 31 is driven according to this color signal. In this connection, the VIF circuit 20 generates AFT voltage according to a shift of the frequency of an actual image carrier wave from the reference frequency. This AFT voltage and the synchronizing signal separated from the video IC 30 are supplied to the microcomputer 50.

The microcomputer 50 can supply the frequency data to the tuner 10, that is, a receiving frequency of the tuner 10 is controlled by this microcomputer 50. Operation will be more specifically described as follows. When a remote controller 60 is operated so that a predetermined channel can be received, an infrared remote control signal, which corresponds to the operation, is sent out from the remote controller 60. The microcomputer 50 receives the infrared remote control signal via a control signal light receiving section (not shown), and frequency data is sent out to the tuner 10 so that the corresponding channel can be received. Since the channel plans of TV broadcasting and CATV broadcasting are different from each other as shown in FIG. 2, it is necessary to send the corresponding frequency data according to the mode of television broadcasting to be received. Therefore, in this embodiment, the channel plan of TV broadcasting and CATV broadcasting shown in FIG. 2 is stored in a predetermined storage medium, and the microcomputer 50 selects a corresponding channel plan according to the television broadcasting to be received, so that the selected channel plan can be used for the tuning control.

Figure 3:
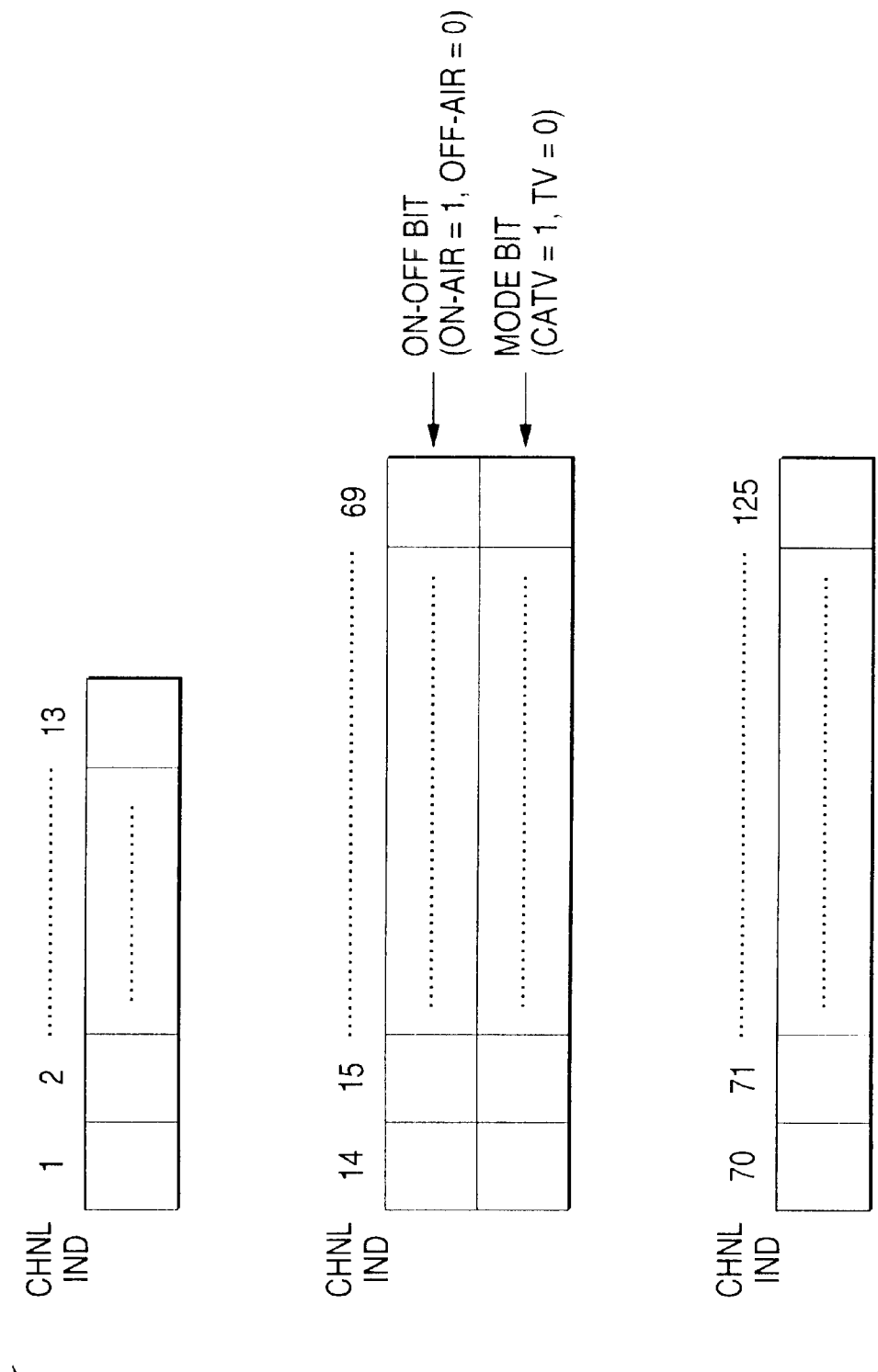
FIG. 3 is a diagram for explaining memory positions.

In this connection, irrespective of TV broadcasting or CATV broadcasting, an actual television broadcasting signal does not necessarily exist in each channel frequency. Therefore, in this embodiment, an "on-air channel", in which a television broadcasting signal exists, is previously stored, and tuning is conducted according to the content of memory, that is, a channel preset function is provided. In this connection, in this embodiment, in a memory region of an EEPROM 70, there are provided memory positions corresponding to the channel numbers (CHNL, IND) shown in FIG. 3. "On-air data" is stored at the memory position of the on-air channel according to the channel preset processing of the microcomputer 50.

In this case, as shown in FIG. 2, the same channel frequencies of TV broadcasting and CATV broadcasting are allocated to the respective channels "1" to "13". Therefore, a memory position of one bit, which is common between both of them, is allocated, and in the case of "on-air", "1" is set at the memory position by the channel preset processing, and in the case of "off-air", "0" is set. Concerning the respective channel numbers of "70" to "125", the channel frequencies are allocated only to CATV broadcasting. Accordingly, a memory position of one bit, which is exclusively used for CATV broadcasting, is allocated. In the same manner, according to whether broadcasting signal exists, "1" or "0" is set.

On the other hand, concerning the respective channel numbers of "14" to "69", the channel frequencies are allocated in both of TV broadcasting and CATV broadcasting, however, the channel frequencies for the respective channel numbers are different from each other. Therefore, a memory position composed of two bits including on-off bit and mode bit is allocated, and whether or not a television broadcasting signal exists can be expressed by the bit pattern. The meanings of the on-off bit and the mode bit are described as follows. When "1" is set at the former, it means "on-air". When "0" is set at the former, it means "off-air". When "1" is set at the latter, it means a CATV broadcasting. When "0" is set at the latter, it means a TV broadcasting. Accordingly, when the channel of CATV broadcasting is "on-air", "1" and "1" are set at the respective bits by the channel preset processing, and when the channel of TV broadcasting is "on-air", "1" and "0" are set at the respective bits by the channel preset processing.

The microcomputer 50 refers to the data set in the memory position for controlling the tuning conducted by the tuner 10. For example, when the remote controller 60 gives a direction of channel-up or channel-down, the memory positions having the on-air data are searched upward or downward while the memory position of the present channel number is used as a starting point, and the tuner 10 is tuned to the channel frequency of television broadcasting for the detected memory position. Of course, the channel plan to be referred is appropriately changed over according to whether the detected position is CATV broadcasting or TV broadcasting.

Figure 4:
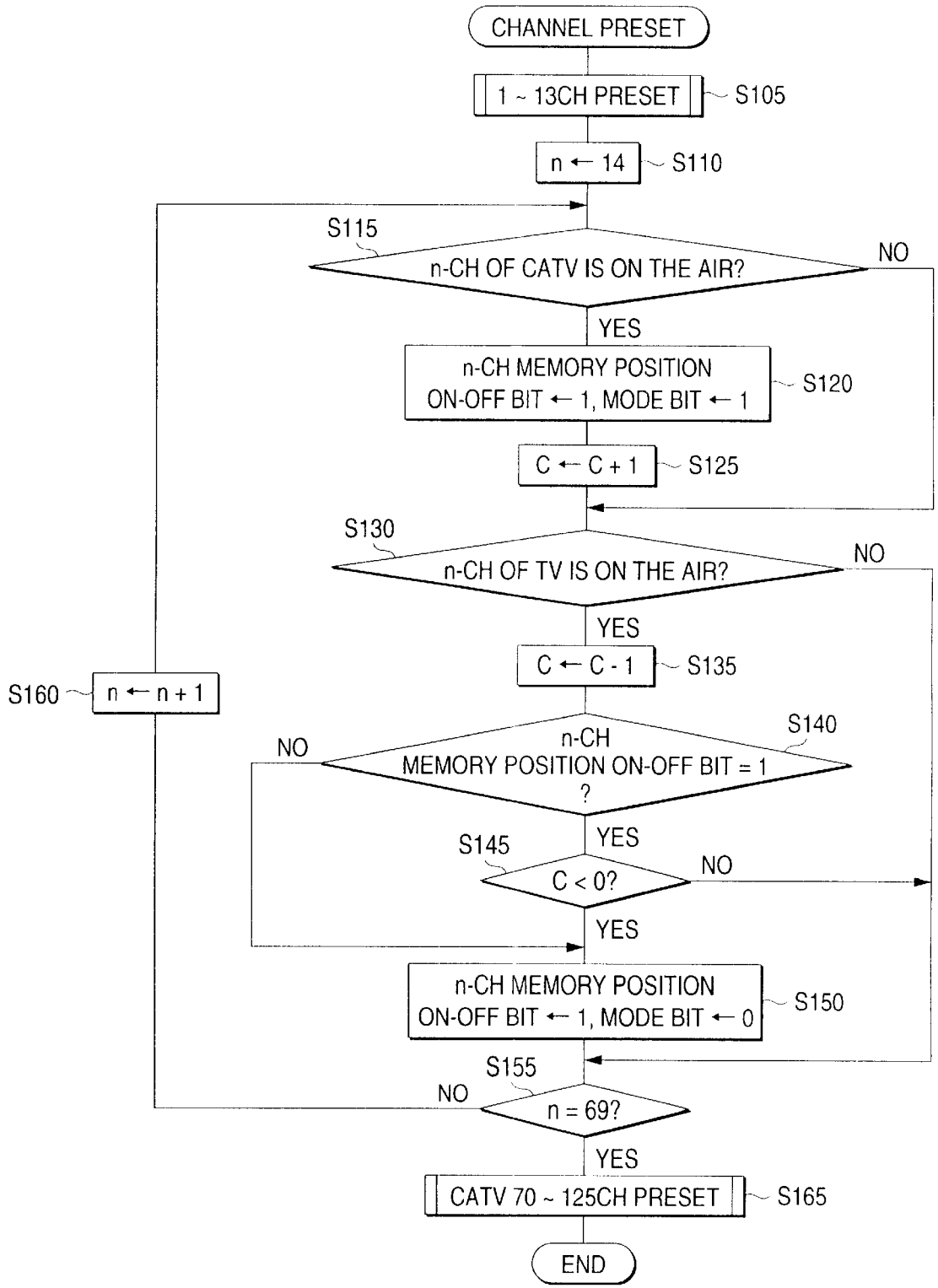
FIG. 4 is a flow chart showing a procedure of channel preset according to a first embodiment of the present invention.
Figure 5:
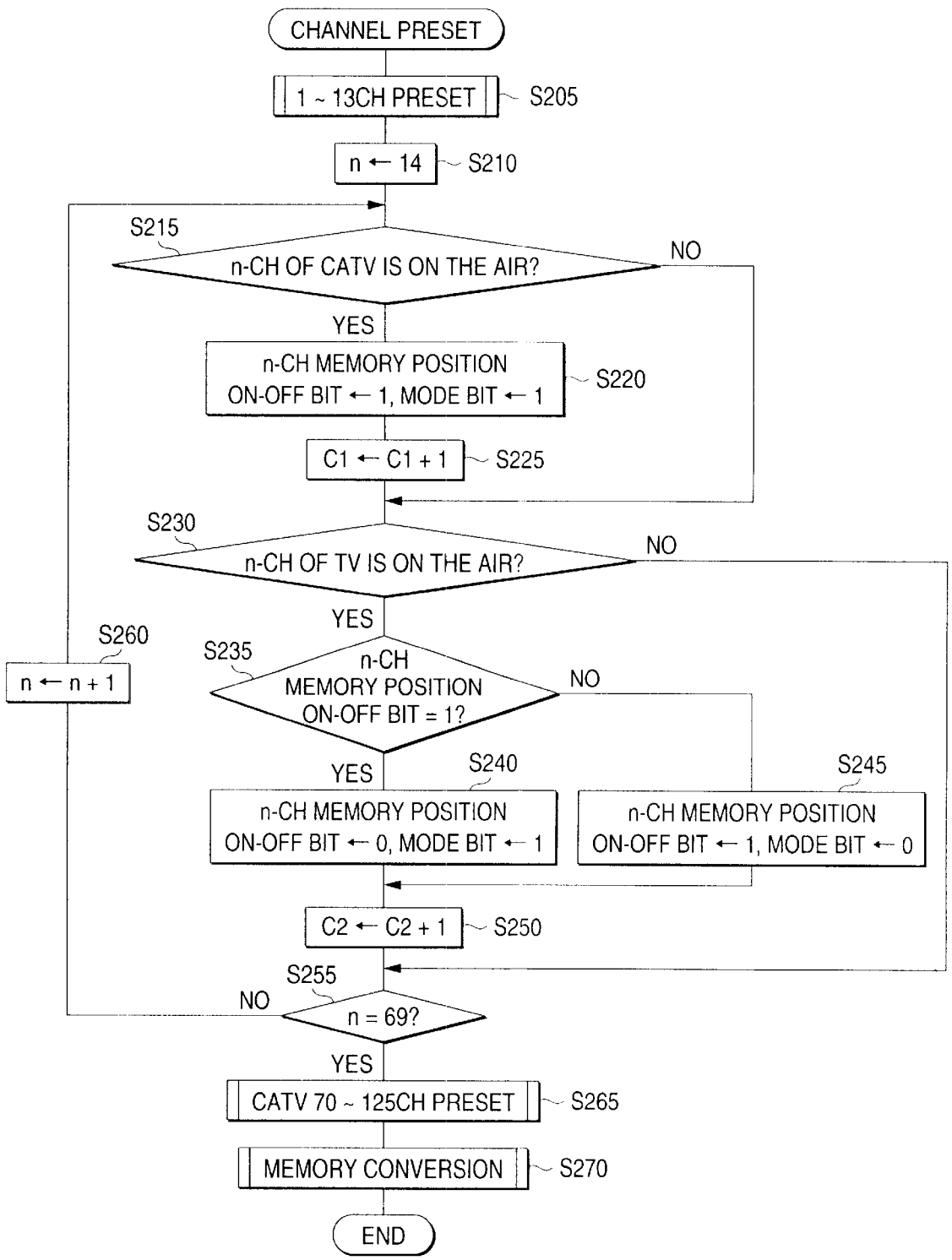
FIG. 5 is a flow chart showing a procedure of channel preset according to a second embodiment of the present invention.

In order to execute the above channel preset operation, a command of the channel preset is given by depressing an operation button of the remote controller 60 (not shown). Then, in the same manner as that described above, an infrared remote control signal is transmitted from the remote controller 60. This infrared remote control signal is detected by the microcomputer 50, and the channel preset processing is carried out as shown in the flow chart of FIG. 4.

First, in step S105 shown in the drawing, the tuner 10 successively tunes the receiver to the channel frequencies of the channel numbers "1" to "13". At each channel frequency, it is judged whether a broadcasting is on the air in accordance with existence of a synchronizing signal sent from the video IC 30 and the AFT voltage sent from the VIF circuit 20.

When a television broadcasting signal exists at the channel frequency to which the tuner 10 has tuned the receiver, the video IC 30 can separate the synchronizing signal and supply the same to the microcomputer 50, and at the same time, the AFT voltage is supplied to the microcomputer 50. At this time, the microcomputer 50 judges whether or not the synchronizing signal exists, and when it is judged that the synchronizing signal exists, it is judged by utilizing the AFT voltage whether or not it is possible to draw the signal to the normal tuning point. When it is possible to pull the signal into the standard tuning point, it is judged that a broadcasting is on the air, and "1" is set at the corresponding memory position. When it is impossible to pull the signal into the standard tuning point, it is judged that no broadcasting is on the air. In this case, a value of the memory position is set at "0". In this connection, although not shown in the figure, values of all memory positions are cleared to be zero previous to the step S105.

In the next step S110, "14" is set at a predetermined variable n. After that, in step S115, the receiver is tuned to the channel frequency of CATV broadcasting for the channel number which has been set at the channel variable n. In the same manner as that described above, it is judged whether a CATV broadcasting is on the air. In the case where it has been judged that a CATV broadcasting is on the air, the on-off bit of the memory position with respect to the channel number is set at "1" and also the mode bit is set at "1" in step S120. After that, a predetermined counter C is counted up in step S125. Of course, this counter C is set at "0" in the initial condition.

When it has been judged in step S115 that no CATV broadcasting is on the air, or after the counter C has been counted up in step S125, the receiver is tuned to the channel frequency of TV broadcasting for the above channel number in step S130. In the same manner as that described above, it is judged whether a TV broadcasting is on the air. When it has been judged that a TV broadcasting is on the air, the counter C is counted down in step S135. In the next step S140, the memory position for the above channel number is referred, and it is detected whether or not "1" is set at the on-off bit. When it has been detected that "1" is set at the on-off bit, it is judged in step S145 whether or not the counter C is lower than "0". When is has been judged that the counter C is lower than "0", the on-off bit of the memory position for the above channel number is set at "1", and the mode bit is set at "0".

Only when it has been judged in step S140 that the on-off bit is "1", the processing passes through step S150. Because the processing passes through step S120, the on-off bit is "1". Accordingly, immediately before the processing of step S150 is carried out, "1" is set at both the on-off bit and the mode bit. Therefore, in step S150, only the mode bit may be set at "0".

In the case where the counter C is not lower than "0" in step 145, or after the data of the memory position has been renewed in step S150, it is judged in step S155 whether or not the channel variable n is "69". In this case, when it has been judged that the channel variable n is not "69", "1" is added to the channel variable n in step S160, and the processing returns to step S115 and the same processing is carried out. Then, in step S155, the same processing is repeatedly carried out until it is judged that the channel variable n is "69". Due to the foregoing, the memory positions of the channel numbers "14" to "69" are appropriately rewritten. After that, in step S165, the tuner successively tunes the receiver to the channel frequencies of CATV broadcasting, the channel numbers of which are "70" to "125". In the same manner, with respect to the on-air channel frequency, "1" is set to the memory position of the corresponding channel number. In this way, the channel preset operation is completed.

The reason why the above channel preset processing is carried out is as follows.

When it has been detected in step S140 that "1" is set at the on-off bit, it is judged that both of the CATV broadcasting and the TV broadcasting are on the air at the same channel number. As is described before, since only one of the CATV broadcasting and the TV broadcasting can be actually received, it is realized one of them has been erroneously detected in such a case. Accordingly, in step S145, reference is made to the counter C. This counter is counted up each time the "on-air" channel of CATV broadcasting is detected, and also is counted down each time the "on-" channel of TV broadcasting is detected. For the above reasons, when the CATV broadcasting is receivable, the counter C tends to show a positive value, and when TV broadcasting is receivable, the counter C tends to show a negative value.

Consequently, when it has been judged that both broadcastings are on-air at the same channel number, it is judged which broadcasting is receivable according to the detection result so far. In the case where it has been judged by the counter that the TV broadcasting is receivable, the bit pattern (on-off bit=1, mode bit=1) for CATV broadcasting, which has been set in step S120, is replaced with the bit pattern (on-off bit=1, mode bit=0) for TV broadcasting. Namely, although there is a possibility that it is judged both of the CATV broadcasting and the TV broadcasting are on the air at the same channel number, the mode bit is rewritten so as to indicate the broadcasting mode in which the larger number of the on-air channels have been detected so far.

Since only when it is judged that both of the CATV broadcasting and the TV broadcasting are on the air at the same channel number, the above rewriting is conducted, there is a possibility that both of the memory position indicating the CATV broadcasting is on the air and the memory position indicating the TV broadcasting is on the air are existing together in the memory after the preset processing is conducted although only one of the CATV broadcasting and the TV broadcasting can be originally received. However, even if the rewriting result includes an erroneous judgement, since any other memory positions are never written, more accurate tuning according to the data of memory positions can be achieved.

Subsequently, the tuner 10 successively tunes the receiver to the channel frequencies of the CATV broadcasting, the channel numbers of which are "70" to "125". In the same manner, with respect to a channel frequency in which a broadcasting is on the air, "1" is set at the memory position of the corresponding channel number (step 165). In this way, the channel preset is completed.

After the completion of channel preset, when the remote controller 60 gives a direction of channel-up or channel-down, the "on-air" memory positions are searched upward or downward while the memory position of the present channel number is used as a starting point, and the tuner 10 is tuned to the channel frequency of television broadcasting indicated by the detected memory position. Of course, the channel plan to be referred is appropriately changed over according to the judged broadcasting mode.

According to the misrewriting described above, a memory position, at which "on-air" is stored although no broadcasting is on the air, can be found in an actual tuning operation. In such a case, an "off-air" setting is conducted by manual operation with respect to the misjudged channel. After that, such the channel is skipped in the process of tuning.

A second embodiment of the present invention will be explained as follows with reference to FIGS. 5 to 10.

A hardware configuration of the second embodiment is the same as that of the first embodiment described above, however, a procedure of channel preset processing of this embodiment is different from that of the first embodiment and will be explained below.

When channel preset is executed, channel preset is directed by pressing an operation button (not shown) of the remote controller 60. An infrared remote control signal is transmitted from the remote controller 60 in the same manner. This infrared remote control signal is detected by the microcomputer 50. The channel preset processing is executed along the flow chart shown in FIG. 5.

In step S205 shown in the drawing, the tuner 10 successively tunes the receiver to the channel frequencies of the channel numbers "1" to "13". At each channel frequency, it is judged whether a broadcasting is on the air in the same manner. When it is judged that a broadcasting is on the air, "1" is set at the corresponding memory position. In this case, values of all memory positions are cleared to be zero at the front stage of step S205. In the next step S210, "14" is set at a predetermined variable n. After that, in step S215, the receiver is tuned to the channel frequency of CATV broadcasting for the channel number which has been set at the channel variable n. In the same manner as that described above, it is judged whether a broadcasting is on the air. In the case where it has been judged that a broadcasting is on the air, the on-off bit of the memory position with respect to the channel number is set at "1" and also the mode bit is set at "1" in step S220. After that, a predetermined counter C1 is counted up in step S225. Of course, this counter C1 is set at "0" in the initial condition.

When it has been judged in step S215 that no broadcasting is on the air, or after the counter C1 has been counted up in step S225, the receiver is tuned to the channel frequency of TV broadcasting for the above channel number in step S230, and it is judged whether a broadcasting is on the air. When it has been judged that a broadcasting is on the air, it is judged whether or not "1" is set at the on-off bit of the memory position in step S235. When it is judged that "1" is set at the on-off bit of the memory position, the on-off bit and the mode bit of the memory position are respectively set at "0" and "1". On the other hand, in the case where it is judged that "1" is not set at the on-off bit, the on-off bit and the mode bit of the memory position are respectively set at "1" and "0" in step S245. That is, in the case where it is judged that a broadcasting is on the air at the same channel number in both CATV broadcasting and TV broadcasting, the on-off bit and the mode bit are respectively set at "0" and "1". In the case where only TV broadcasting is judged to be on-air, the on-off bit and the mode bit are respectively set at "1" and"0".

After that, a predetermined counter C2 is counted up in step S250. Of course, this counter C2 is set at "0" in the initial condition. In the next step S255, it is judged whether or not the channel variable n is "69". When it has been judged that the channel variable n is "69", "1" is added to the channel variable n in step S260, and the processing returns to step S215, and the same processing is carried out. Then, in step S255, the same processing is carried out in turns until it is judged that the channel variable n is "69". Due to the foregoing, the memory positions of the channel numbers "14" to "69" are appropriately rewritten. After that, in step S265, the tuner 10 successively tunes the receiver to the channel frequencies of the channel numbers "70" to "125" in CATV broadcasting. In the same manner, "1" is set at the memory position of the corresponding channel number with respect to the channel frequency including a broadcasting signal. Then, processing for converting the memory is executed in step S270.

Figure 6:
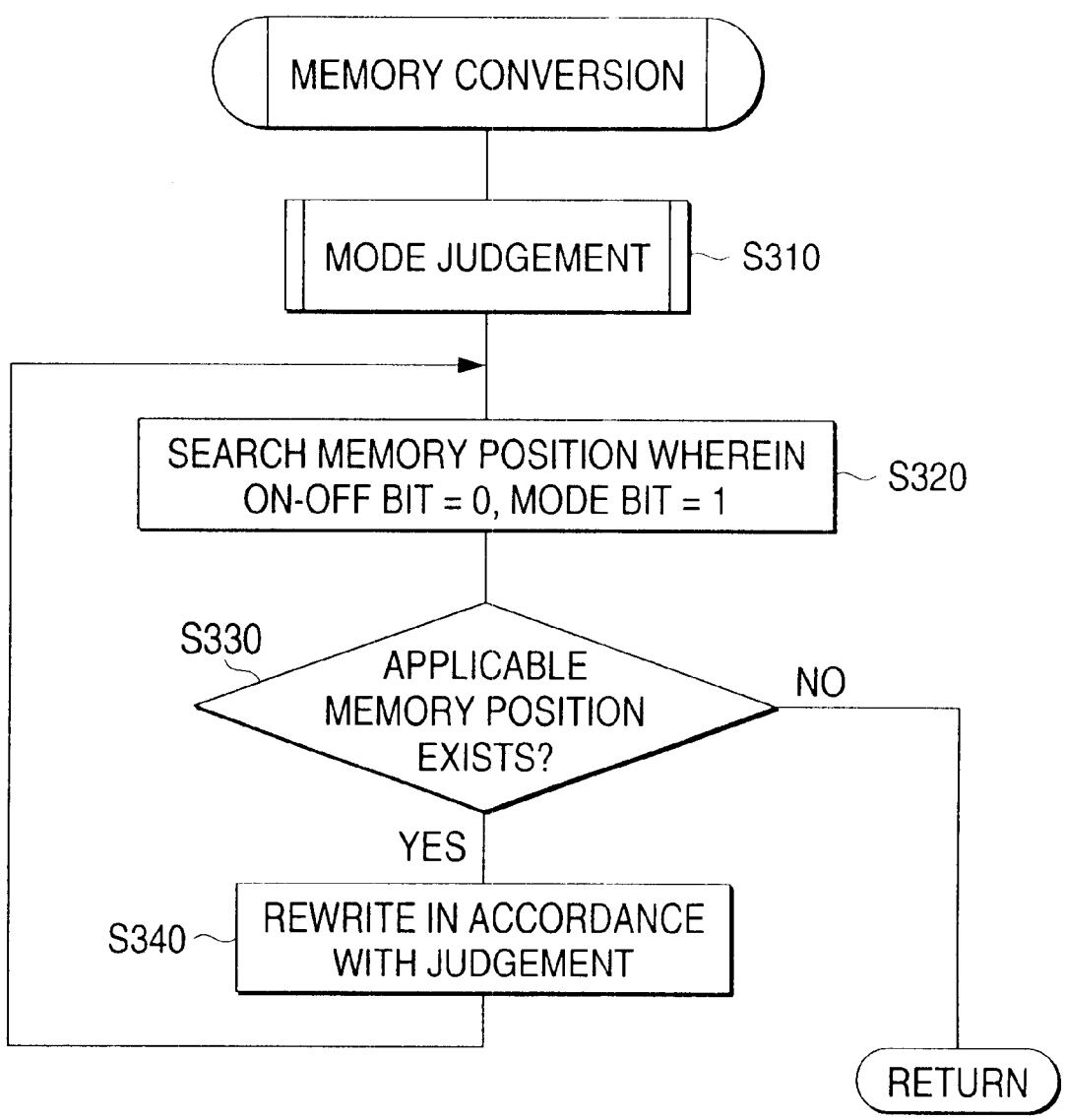
FIG. 6 is a flow chart showing a procedure of memory conversion processing.

FIG. 6 is a flow chart showing an example of the procedure for converting the memory.

In the flow chart, in step S310, it is judged whether the CATV broadcasting or the TV broadcasting is receivable. Of course, various embodiments can be applied to the specific judging procedure, that is, the present invention is not limited to the specific embodiment.

Figure 7:
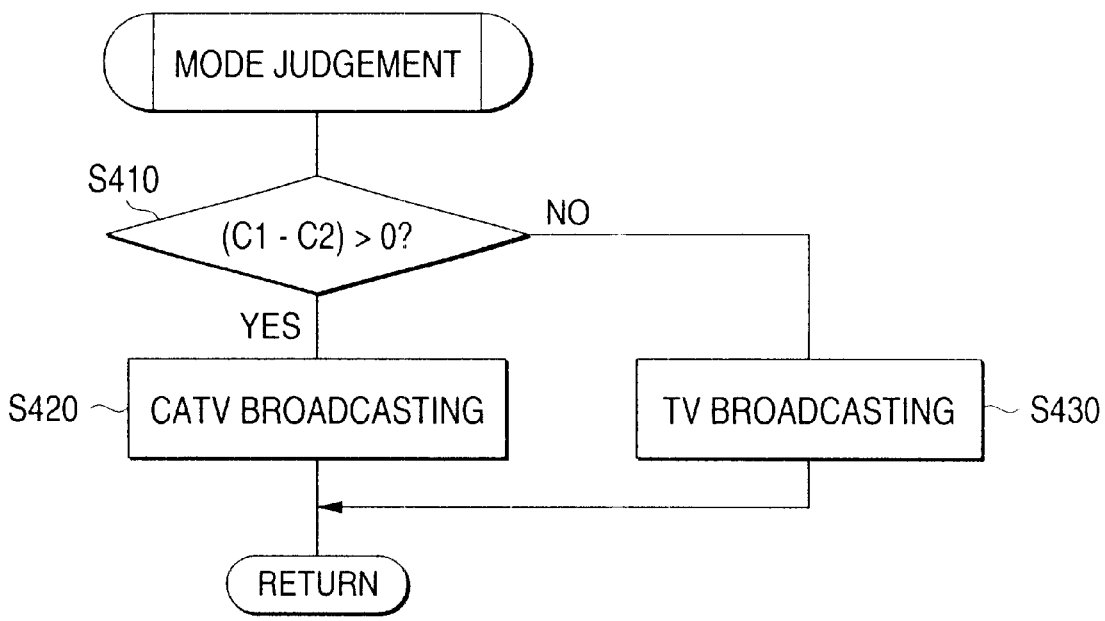
FIG. 7 is a flow chart showing a procedure of television broadcasting judgment processing according to a first example.

For example, as shown in the flow chart of FIG. 7, a difference between the counter C1 for the CATV broadcasting and the counter C2 for the TV broadcasting is taken in step S410. When the difference is larger than "0", it is judged the CATV broadcasting is receivable in step S420. In the cases except for that, it is judged the TV broadcasting is receivable in step S430. That is, the broadcasting mode in which larger number of the on-air channels have been detected in all the channels is judged as receivable.

Figure 8:
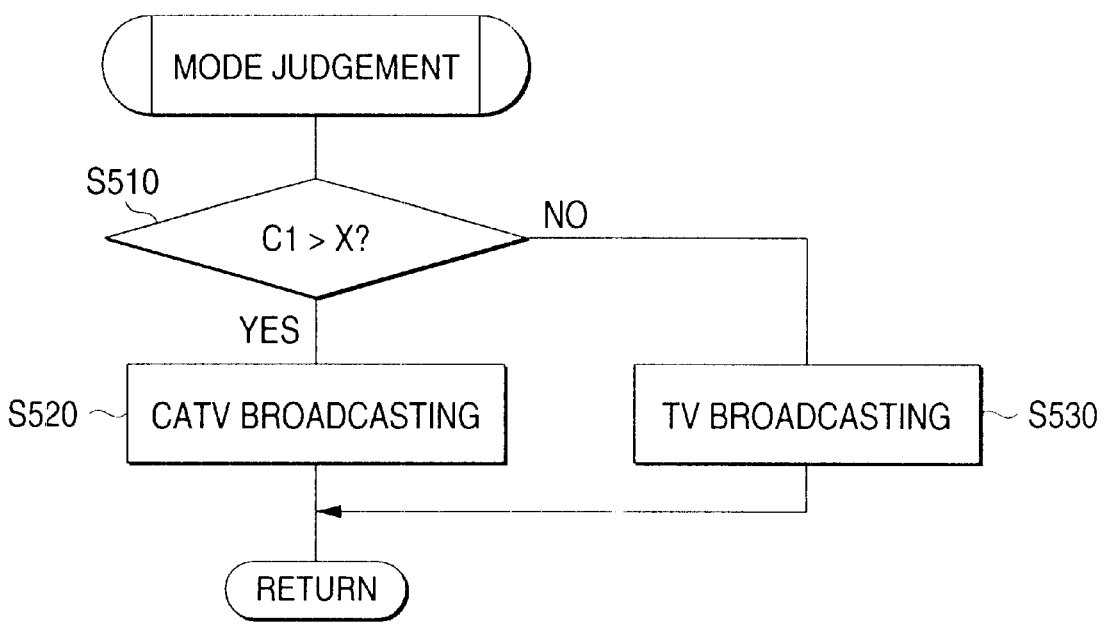
FIG. 8 is a flow chart showing a procedure of television broadcasting judgment processing according to a second example.
Figure 9:
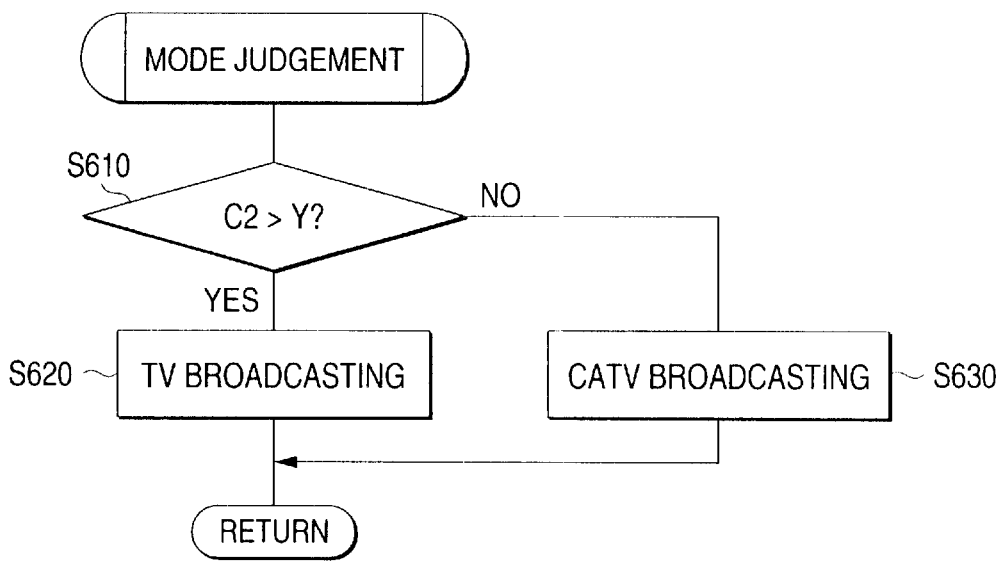
FIG. 9 is a flow chart showing a procedure of television broadcasting judgment processing according to a third example.

As shown in the flow chart of FIG. 8, the counter C1 for the CATV broadcasting is compared with a predetermined constant X in step S510. When the former is larger than the latter, it is judged the CATV broadcasting is receivable in step S520. In the cases except for that, it is judged the TV broadcasting is receivable in step S530. In the same manner, as shown in the flow chart of FIG. 9, the counter C2 for the TV broadcasting is compared with a predetermined constant Y in step S610. When the former is larger than the latter, it is judged the TV broadcasting is receivable in step S620. In the cases except for that, it is judged the CATV broadcasting is receivable in step S630. In these procedures, the minimum estimated number of on-air channels of the CATV broadcasting is defined as X, and the minimum estimated number of on-air channels of the TV broadcasting is defined as Y. The receivable television broadcasting mode is judged by comparing X or Y with the number of channels which have been actually judged to be on-air. In the methods shown in FIGS. 7 to 9, according to all channel numbers which have been actually judged to be on-air, it is judged which television broadcasting mode is receivable. Therefore, the higher reliability of judgment can be attained.

Figure 10:
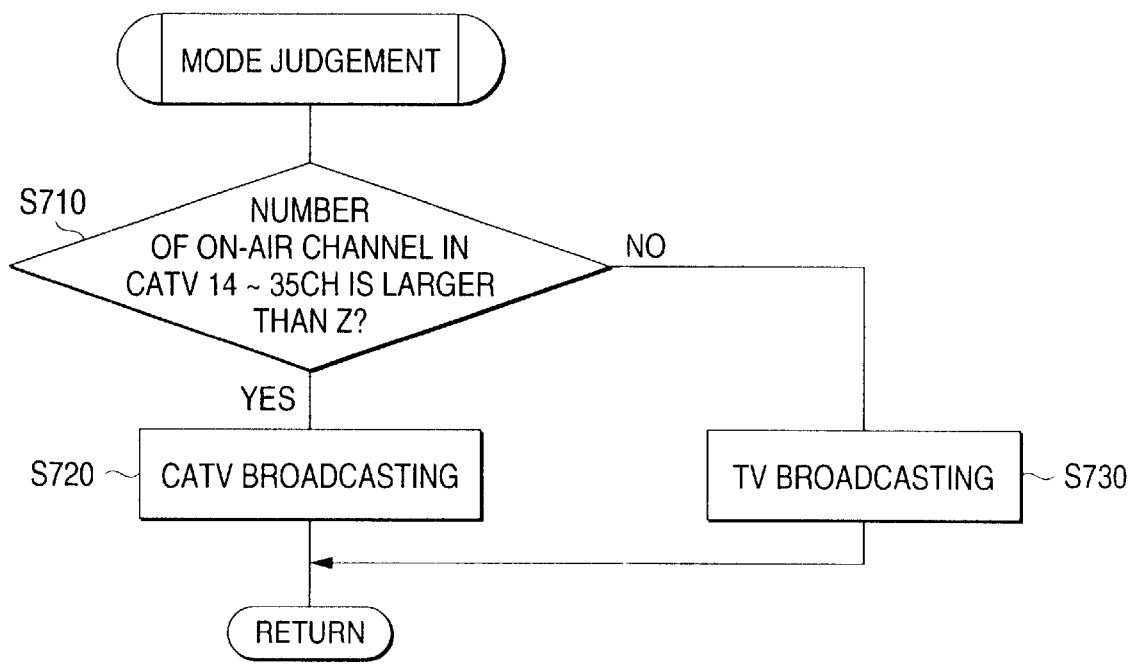
FIG. 10 is a flow chart showing a procedure of television broadcasting judgment processing according to a fourth example.

As shown in the flow chart of FIG. 10, in step S710, the number of channels which have been judged to be on-air in the channel numbers "14" to "35" of the CATV broadcasting is compared with a predetermined number Z. When the former is larger than the latter, it is judged the CATV broadcasting is receivable in step S720. In the cases except for that, it is judged the TV broadcasting is receivable in step S730. That is, consideration is given to the following facts. As shown in FIG. 2, the channel frequencies allocated to the channel numbers "14" to "35" of the CATV broadcasting are allocated to the frequency band to which the channel frequencies are not allocated in the TV broadcasting. The number of channels of the CATV broadcasting which have been judged to be on-air is detected and compared with the constant Z. Due to the foregoing, the receivable broadcasting mode can be judged.

After the receivable broadcasting mode is judged in step S310, memory positions at which the on-off bit and the mode bit are respectively "0" and "1" at the channel numbers "14" to "69" are searched in step S320. Only when on-air is judged in both the CATV broadcasting and the TV broadcasting, the on-off bit and the mode bit respectively become "0" and "1". A memory position having the above data is searched.

In the case where the memory position concerned is existing, the sequence passes through step S330, and the data of the memory position is rewritten according to the broadcasting mode which has been judged as receivable in step S340. Specifically, when it is judged that the CATV broadcasting is receivable in step S310, the on-off bit and the mode bit are respectively set at "1" and "1". When it is judged that the TV broadcasting is receivable, the on-off bit and the mode bit are respectively set at "1" and "0". After that, in the same manner as that described above, memory positions, the on-off bits and the mode bits of which are respectively "0" and "1", are successively detected and rewritten. In this way, channel presetting is completed.

In this second embodiment, on-air channels are detected in all channels of the CATV broadcasting and the TV broadcasting and stored in the corresponding memory positions. After that, the data of the memory position, at which "on-air" data is stored at the same channel number in both broadcasting modes, is rewritten. On the other hand, in the first embodiment described above, in the case where it is judged that a broadcasting is on the air at the same channel number in both broadcasting modes, the receivable broadcasting mode is successively judged while tuning is being alternately conducted on the channel frequencies of the same channel numbers of the CATV broadcasting and the TV broadcasting, and the judged broadcasting mode is stored as receivable. Even when any method is adopted, the receivable broadcasting mode is judged only when it is judged that a broadcasting is on the air at the same channel number in both broadcasting modes. Accordingly, even if the receivable broadcasting is misjudged in the above case, there is no possibility that a memory position, which has not been judged both broadcasting modes are on the air at the same channel number, is rewritten. Consequently, more accurate tuning operation in accordance with the data in the memory position can be attained.

After the completion of channel preset, when the remote controller 60 gives a direction of channel-up or channel-down, memory positions having the on-air data are searched upward or downward while the memory position of the present channel number is used as a starting point, the tuner 10 is tuned to the channel frequency of television broadcasting for the detected memory position. Of course, the channel plan to be referred is appropriately changed over according to whether the detected position is the CATV broadcasting or the TV broadcasting. In the case where the channel number has been found in the process of tuning at which "on-air" is stored although the channel number is originally "off-air", setting of this channel number is conducted again by manual operation so as to indicate "off-air". After that, the channel numbers are skipped in the process of tuning.

As has been described heretofore, when the tuner 10 is capable of receiving one of the signals of the TV broadcasting and the CATV broadcasting, while the microcomputer 50 is successively making the tuner 10 tune the receiver to the channel frequencies allocated to both broadcasting modes, it is judged whether a broadcasting is on the air. When it is judged that a broadcasting is on the air, the broadcasting is preset to the corresponding channel number. In this process of presetting, the receivable broadcasting mode is judged only when it is judged that a broadcasting is on the air at the same channel number in both broadcasting modes. Consequently, more accurate tuning operation in accordance with the data in the memory position can be attained.

What is claimed is:

1. A channel preset device in a television receiver for receiving one of two television broadcasting modes having different frequency bands with respect to one another, comprising:

signal receiving means for receiving a signal by successively tuning to the respective frequencies of both of the two broadcasting modes allocated to each of channels;

on-air judgment means for judging whether each of the received signals includes an actual broadcasting signal, and determining a channel in which the actual broadcasting signal is detected as an on-air channel;

count means for counting the number of channels judged as on-air channels with respect to each of the two broadcasting modes;

mode judgement means for judging a receivable broadcasting mode out of the two broadcasting modes in accordance with the counted number of on-air channels; and channel preset means for conducting a channel preset with respect to the receivable broadcasting mode.

2. The channel preset device as set forth in claim 1, wherein the two broadcasting modes are a normal television broadcasting using a ground wave and a cable television broadcasting.

3. The channel preset device as set forth in claim 1, wherein the mode judgement means judges the receivable broadcasting mode in accordance with the numbers of the on-air channel which have been counted by the count means so far each time when the on-air judgement means detects the actual broadcasting signal in the both broadcasting modes in association with the same channel.

4. The channel preset device as set forth in claim 1, further comprising:

memory means for storing a channel number of which the actual broadcasting signal is detected in the both broadcasting modes at once; and means for setting the judged receivable broadcasting mode judged by the mode judgement means into the channel stored in the memory means.

5. The channel preset device as set forth in claim 4, wherein the count means counts how many number of on-air channels are present from among all of the channels of the television receiver, and wherein the mode judgement means judges a broadcasting mode having a larger number of the on-air channels as the receivable broadcasting mode.

6. The channel preset device as set forth in claim 4, wherein the count means counts the number of the on-air channel with respect to only the channels to which different frequencies are allocated with regard to the both broadcasting modes, and wherein the mode judgement means judges a broadcasting mode having a larger number of the on-air channels as the receivable broadcasting mode.

7. The channel preset device as set forth in claim 4, further comprising:

comparison means for comparing the counted number of the on-air channel with regard to one of the both broadcasting modes to a predetermined number, wherein the mode judgement means judges the compared broadcasting mode as the receivable broadcasting mode when the counted number of the on-air channel is larger than the predetermined number.

8. The channel preset device as set forth in claim 7, wherein the predetermined number is the minimum estimated number of the on-air channel of the respective broadcasting modes.

9. A channel preset method for a television receiver for receiving one of two television broadcasting modes having different frequency bands with respect to one another, the method comprising the acts of:

receiving a signal by successively tuning to the respective frequencies of both of the two broadcasting modes allocated to each of channels;

judging whether each of the received signals includes an actual broadcasting signal;

determining a channel in which the actual broadcasting signal is detected as an on-air channel;

counting the number of channels judged as on-air channels for each of the two broadcasting modes;

judging a receivable broadcasting mode out of the two broadcasting modes in accordance with the counted number of on-air channels; and conducting a channel preset with respect to the receivable broadcasting mode.

10. The channel preset method as set forth in claim 9, wherein the two broadcasting modes are a normal television broadcasting using a ground wave and a cable television broadcasting.

11. The channel preset method as set forth in claim 9, wherein the receivable broadcasting mode is judged in accordance with the numbers of the on-air channel which have been counted so far each time when the actual broadcasting signal in the both broadcasting modes in association with the same channel.

12. The channel preset method as set forth in claim 9, further comprising the steps of:

storing a channel number of which the actual broadcasting signal is detected in the both broadcasting modes into memory means at once; and setting the judged receivable broadcasting mode into the channel stored in the memory means.

13. The channel preset method as set forth in claim 12, wherein the number of on-air channels present from among all of the channels of the television receiver is counted, and wherein a broadcasting mode having a larger number of the on-air channels is judged as the receivable broadcasting mode.

14. The channel preset method as set forth in claim 12, wherein the number of the on-air channel is counted with respect to only the channels to which different frequencies are allocated with regard to the both broadcasting modes, and wherein a broadcasting mode having a larger number of the on-air channels is judged as the receivable broadcasting mode.

15. The channel preset device as set forth in claim 12, further comprising the step of:

comparing the counted number of the on-air channel with regard to one of the both broadcasting modes to a predetermined number, wherein the compared broadcasting mode is judged as the receivable broadcasting mode when the counted number of the on-air channel is larger than the predetermined number.

16. The channel preset device as set forth in claim 15, wherein the predetermined number is the minimum estimated number of the on-air channel of the respective broadcasting modes.

17. A channel preset device in a television receiver for receiving one of two television broadcasting modes having different frequency bands with respect to one another, comprising:
   a television tuner that receives a signal by successively tuning to the respective frequencies of both of the two broadcasting modes allocated to channels:
   an on-air judgment circuit that judges whether each of the received signals includes an actual broadcasting signal, and determines a channel in which the actual broadcasting signal is detected as an on-air channel;
   a counter that counts the number of channels judged as being on-air channels with respect to each of the two broadcasting modes;
   a mode judgement circuit that judges a receivable broadcasting mode out of the two broadcasting modes in accordance with the counted number of on-air channels; and
   a channel preset circuit for conducting a channel preset with respect to the receivable broadcasting mode.

18. The channel preset device according to claim 17, wherein the two television broadcasting modes are a normal television broadcast using a ground wave and a cable television broadcast.

19. The channel preset device according to claim 17, wherein the mode judgment circuit judges the receivable broadcasting mode in accordance with the number of on-air channels which have been counted by the counter to that point each time the on-air judgment circuit detects the actual broadcast signal in both broadcasting modes in association with the same channel.

20. The channel preset device according to claim 17, further comprising:
   a memory that stores a channel number of which the actual broadcasting signal is detected in both broadcasting modes at once; and
   a setting circuit that sets the receivable broadcasting mode that was judged by the mode judgment circuit into the channel stored in the memory.

21. The channel preset device according to claim 20, wherein the counter counts how many on-air channels are present from among all of the channels of the television receiver; and
   wherein the mode judgment circuit judges that a broadcasting mode having a larger number of on-air channels is the receivable broadcasting mode.

22. The channel preset device according to claim 20, wherein the counter counts the number of on-air channels with respect to only those channels to which different frequencies are allocated with regard to both broadcasting modes; and
   wherein the mode judgment circuit judges that a broadcasting mode having a larger number of on-air channels is the receivable broadcasting mode.

23. The channel preset device according to claim 20, further comprising:
   a comparator that compares the counted number of on-air channels with regard to one of the two broadcasting modes against a predetermined number; and
   wherein the mode judgment circuit judges that the compared broadcasting mode is the receivable broadcasting mode when the counted number of on-air channels is larger than the predetermined number.

24. The channel preset device according to claim 23, wherein the predetermined number is a minimum estimated number of on-air channels of the respective broadcasting modes.

* * * * *